United States Patent [19]

Everts

[11] Patent Number: 5,524,935

[45] Date of Patent: Jun. 11, 1996

[54] TELESCOPING FLUID COUPLING

[76] Inventor: Michael Everts, 1920 Ninth Ave. North, Great Falls, Mont. 59401

[21] Appl. No.: 405,363

[22] Filed: Mar. 16, 1995

[51] Int. Cl.$^6$ .................................................. F16L 55/00
[52] U.S. Cl. .................. 285/23; 285/302; 285/379; 285/906
[58] Field of Search ........................... 285/23, 379, 298, 285/302, 344, 906

[56]  References Cited

U.S. PATENT DOCUMENTS

| | | | |
|---|---|---|---|
| 2,264,815 | 12/1941 | Thomson | 285/344 X |
| 3,413,024 | 11/1968 | Farquhar | 285/344 X |
| 3,836,273 | 9/1974 | Gutman et al. | |
| 4,194,765 | 3/1980 | Reddy . | |
| 4,198,080 | 4/1980 | Carpenter . | |
| 4,932,686 | 6/1990 | Anderson, Jr. . | |
| 4,993,756 | 2/1991 | Bechu | 285/344 X |
| 5,082,313 | 1/1992 | Bryant et al. . | |

FOREIGN PATENT DOCUMENTS

| | | | |
|---|---|---|---|
| 859896 | 12/1940 | France | 285/344 |
| 551327 | 2/1943 | United Kingdom | 285/344 |
| 859816 | 1/1961 | United Kingdom | 285/344 |

*Primary Examiner*—Dave W. Arola

[57]  ABSTRACT

A coupling for connecting a pair of pipe ends together. The inventive device includes a main body having a mounting aperture for securing to a first pipe end and a hollow interior which receives a telescoping tube therewithin. A seal is releasably positioned within a circumferential seal mounting groove formed along an interior surface of the main body and engages a seal mounting groove formed along the telescoping tube during a positioning of the telescoping tube within the main body. Once engaged to the seal, the telescoping tube can be slidably positioned within the main body to desired position, with the seal precluding a passage of fluid across a juncture of the telescoping tube and the main body. The telescoping tube can be extended from the main body to couple with a second pipe end positioned a predetermined and fixed distance away from the first pipe end to fluidly couple the pipe ends together.

6 Claims, 1 Drawing Sheet

TELESCOPING FLUID COUPLING

BACKGROUND OF THE INVENTION

1. Field of the Invention

The present invention relates to pipe coupling devices and more particularly pertains to a telescoping fluid coupling for connecting a pair of pipe ends together.

2. Description of the Prior Art

The use of pipe coupling devices is known in the prior art. More specifically, pipe coupling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art pipe coupling devices include U.S. Pat. Nos. 5,082,313; 4,932,686; 4,198,080; 4,194,765; and 3,836,273.

While these devices fulfill their respective, particular objectives and requirements, the aforementioned patents do not disclose a telescoping fluid coupling for connecting a pair of pipe ends together which includes a main body having a mounting aperture for securing to a first pipe end and a hollow interior which receives a portion of a telescoping tube therewithin, and a seal coupled to an end of the telescoping tube within the hollow interior of the main body, wherein the telescoping tube can be slidably positioned within the main body to desired position to couple with a second pipe end positioned a predetermined and fixed distance away from the first pipe end to fluidly couple the pipe ends together.

In these respects, the telescoping fluid coupling according to the present invention substantially departs from the conventional concepts and designs of the prior art, and in so doing provides an apparatus primarily developed for the purpose of connecting a pair of pipe ends together.

SUMMARY OF THE INVENTION

In view of the foregoing disadvantages inherent in the known types of pipe coupling devices now present in the prior art, the present invention provides a new telescoping fluid coupling construction wherein the same can be utilized for connecting a pair of pipe ends together. As such, the general purpose of the present invention, which will be described subsequently in greater detail, is to provide a new telescoping fluid coupling apparatus and method which has many of the advantages of the pipe coupling devices mentioned heretofore and many novel features that result in a telescoping fluid coupling which is not anticipated, rendered obvious, suggested, or even implied by any of the prior art pipe coupling devices, either alone or in any combination thereof.

To attain this, the present invention generally comprises a coupling for connecting a pair of pipe ends together. The inventive device includes a main body having a mounting aperture for securing to a first pipe end and a hollow interior which receives a telescoping tube therewithin. A seal is releasably positioned within a circumferential seal mounting groove formed along an interior surface of the main body and engages a seal mounting groove formed along the telescoping tube during a positioning of the telescoping tube within the main body. Once engaged to the seal, the telescoping tube can be slidably positioned within the main body to desired position, with the seal precluding a passage of fluid across a juncture of the telescoping tube and the main body. The telescoping tube can be extended from the main body to couple with a second pipe end positioned a predetermined and fixed distance away from the first pipe end to fluidly couple the pipe ends together.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescoping fluid coupling apparatus and method which has many of the advantages of the pipe coupling devices mentioned heretofore and many novel features that result in a telescoping fluid coupling which is not anticipated, rendered obvious, suggested, or even implied by any of the prior art pipe coupling devices, either alone or in any combination thereof.

It is another object of the present invention to provide a new telescoping fluid coupling which may be easily and efficiently manufactured and marketed.

It is a further object of the present invention to provide a new telescoping fluid coupling which is of a durable and reliable construction.

An even further object of the present invention is to provide a new telescoping fluid coupling which is susceptible of a low cost of manufacture with regard to both materials and labor, and which accordingly is then susceptible of low prices of sale to the consuming public, thereby making such telescoping fluid couplings economically available to the buying public.

Still yet another object of the present invention is to provide a new telescoping fluid coupling which provides in the apparatuses and methods of the prior art some of the advantages thereof, while simultaneously overcoming some of the disadvantages normally associated therewith.

Still another object of the present invention is to provide a new telescoping fluid coupling for connecting a pair of fixed and spaced pipe ends together.

Yet another object of the present invention is to provide a new telescoping fluid coupling which includes a main body having a mounting aperture for securing to a first pipe end and a hollow interior which receives a portion of a telescoping tube therewithin, and a seal coupled to an end of the telescoping tube within the hollow interior of the main body, wherein the telescoping tube can be slidably positioned within the main body to desired position to couple with a second pipe end positioned a predetermined and fixed distance away from the first pipe end to fluidly couple the pipe ends together.

Even still another object of the present invention is to provide a new telescoping fluid coupling in which the seal is retained within a circumferential seal mounting groove formed along an interior surface of the main body and engages a seal mounting groove formed along the telescoping tube during a positioning of the telescoping tube within the main body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
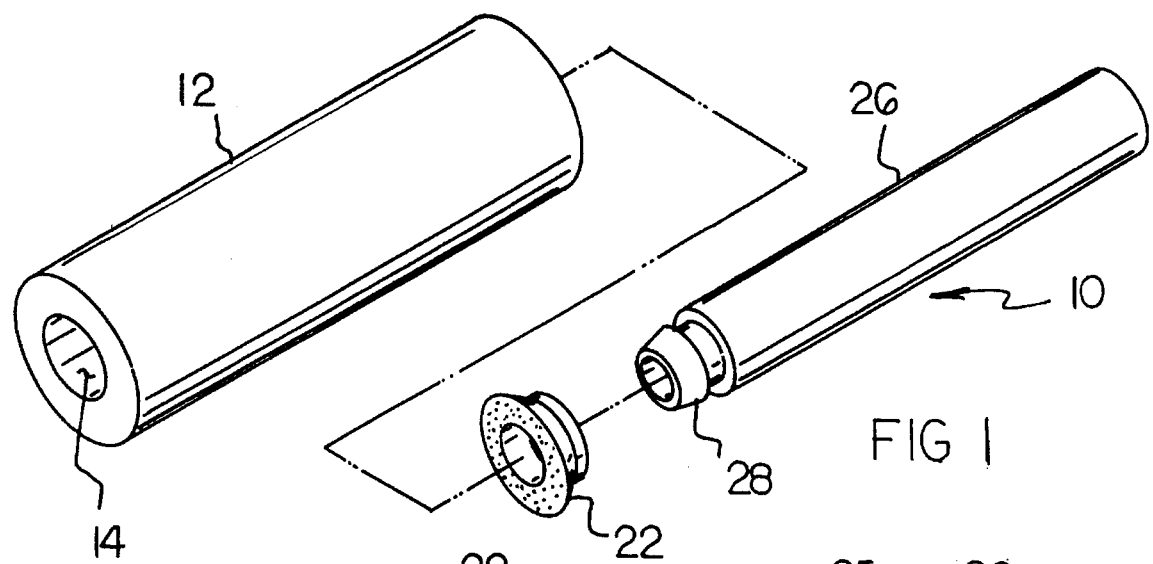
FIG. 1 is an isometric illustration of a telescoping fluid coupling according to the present invention.

With reference now to the drawings, and in particular to FIGS. 1-5 thereof, a new telescoping fluid coupling embodying the principles and concepts of the present invention and generally designated by the reference numeral 10 will be described.

Figure 2:
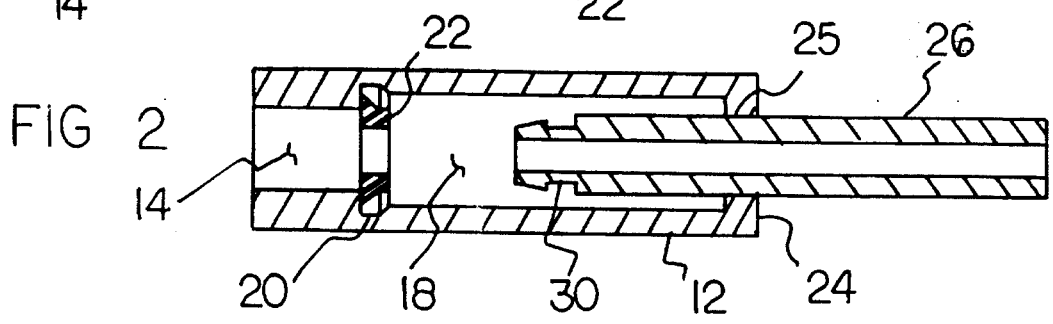
FIG. 2 is a cross sectional view of the present invention.
Figure 4:
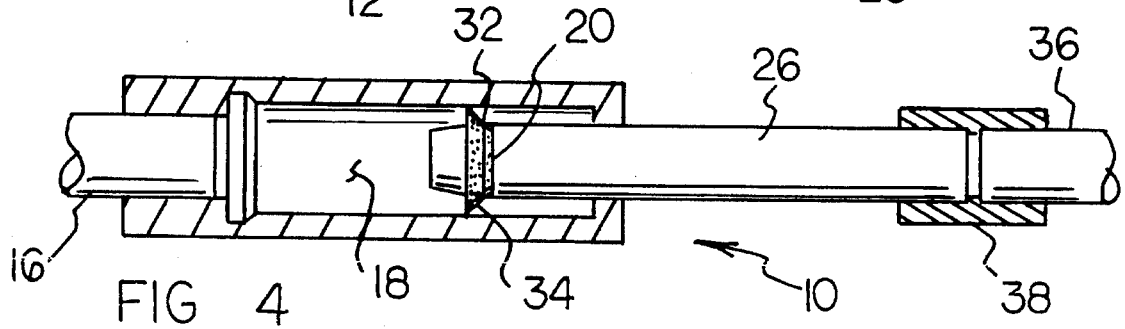
FIG. 4 is a side elevation view, partially in cross section, of the telescoping fluid coupling.
Figure 5:
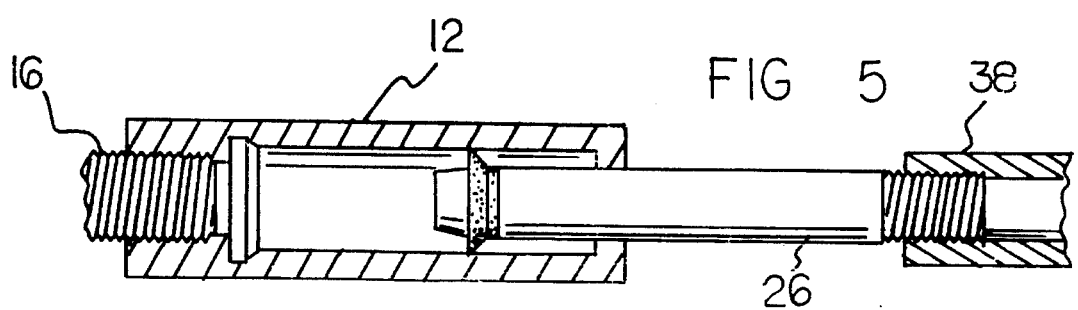
FIG. 5 is a further side elevation view, partially in cross section, of the invention.

More specifically, it will be noted that the telescoping fluid coupling 10 comprises a substantially cylindrical main body 12 having a mounting aperture 14 directed into a first end thereof for receiving or otherwise coupling to a first pipe end 16 by either adhesive or threaded coupling means, as shown in FIGS. 4 and 5. The main body 12 is constructed so as to be substantially seamless and includes a hollow interior 18 with a circumferential seal holding groove 20 being formed along an interior surface of the main body and positioned between the mounting aperture 14 and the hollow interior 18 thereof. The circumferential seal holding groove 20 is characterized as having a first diameter with the mounting aperture 14 having a second diameter, wherein the first diameter is substantially greater than the second diameter to define an unlabeled annular abutment surface against which a seal 22 abuts when the seal is positioned within the circumferential seal holding groove 20, as shown in FIG. 2 for example. Further, the hollow interior 18 of the main body 12 is characterized as having a third diameter, wherein the third diameter is substantially greater than the second diameter and substantially less than the first diameter. By this structure, the seal 22 can be releasably retained within the seal holding groove 20.

The main body 12 includes an end plate 24 integrally or otherwise fixedly secured to a second end thereof which extends substantially orthogonally across the second end of the main body. An entrance aperture 25 extends through the end plate 24 and permits a sliding entrance of a telescoping tube 26 at least partially into the hollow interior 18 of the main body. The telescoping tube is shaped so as to define a tapered end 28 and a circumferential seal mounting groove 30 extending about the telescoping tube and positioned adjacent to the tapered end thereof. By this structure, the telescoping tube 26 can be slidably positioned within the main body 12, whereby the tapered end 28 thereof will engage the seal 22 to project through a center aperture of the seal 22 to position the seal into the seal mounting groove 30 of the telescoping tube.

Figure 3:
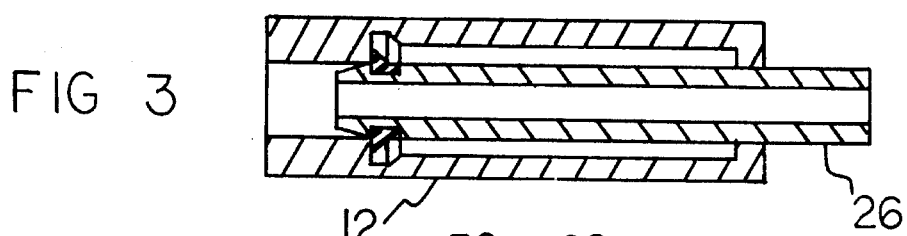
FIG. 3 is a further cross sectional view of the invention.

As shown in FIG. 4, the seal 22 comprises a cylindrical section 32 integrally coupled to a truncated conical section 34. The truncated conical section 34 of the seal 22 tapers from a greater diameter at an outer distal end thereof to a lesser diameter proximal to a center portion thereof, wherein the greater diameter is larger than the lesser diameter. The seal 22 is positioned within the seal holding groove 20, as illustrated in FIG. 2, with the greater diameter of the truncated conical section 34 thereof positioned into abutting engagement with the annular abutment surface to preclude a passage of the seal into the mounting aperture 14. The lesser diameter of the seal 22 is positioned towards the hollow interior 18, with a juncture between the seal holding groove and the hollow interior 18 being tapered to permit an engagement and radial compression of the seal during movement thereof from the seal holding groove and into the hollow interior of the main body 12. By this structure, the telescoping tube 26 can be slidably positioned within the hollow interior 18 of the main body 12 to engage the seal 22, as shown in FIGS. 2 and 3. The seal 22 can then be removed from the seal holding groove 20 and positioned into the hollow interior 18 of the main body 12 wherein it sealingly engages the interior sidewalls therein. The telescoping tube 26 can then be extended a desired distance from the main body 12 to couple with a second pipe end 36 through a coupler 38.

In use, the telescoping fluid coupler 10 can be utilized to fluidly connect a pair of pipe ends 16 and 36 which are fixed a predetermined distance apart. To this end, the main body 12 can simply be threadably or adhesively attached to the first pipe end. The telescoping tube 26 can then be engaged to the seal 22 and utilized to bias the seal from the holding groove 20 and into sealing contact with the hollow interior 18 of the main body 12. The telescoping tube can then be extended a desired distance from the main body and coupled to the second pipe end 36 to complete the connection. The device is particularly useful in coupling the opposed ends of an in-ground sprinkler pipe system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telescoping fluid coupling comprising:
   a main body having a hollow interior, said main body being couplable to a first pipe end to position said hollow interior into fluid communication with said first pipe end;
   a telescoping tube projecting into said hollow interior of said main body and into fluid communication with said hollow interior;
   and,
   a seal extending about said telescoping member and engaging an interior surface of said hollow interior of said main body,
   wherein said main body is shaped so as to define a circumferential seal holding groove formed along said interior surface of said hollow interior thereof, wherein said circumferential seal holding groove is characterized as having a first diameter with said hollow interior being characterized as having a third diameter, wherein said first diameter is substantially greater than said third diameter, said seal being positioned with said seal holding groove,
   wherein said main body is shaped so as to define a mounting aperture directed thereinto, said mounting aperture having a second diameter, wherein the first diameter is substantially greater than the second diameter to define an annular abutment surface against which said seal abuts when said seal is positioned within said circumferential seal holding groove, and said third diameter is intermediate said first and second diameters,
   wherein said telescoping tube is shaped so as to define a tapered end and a circumferential seal mounting groove extending about said telescoping tube and positioned adjacent to said tapered end thereof thereby allowing said seal to pass over said tapered end into said mounting groove as said tube end is telescoped into said mounting aperture and to be withdrawn from said holding groove when said tube end is withdrawn into said hollow interior.

2. The telescoping fluid coupling of claim 1, wherein said seal comprises a cylindrical section coupled to a truncated conical section, said truncated conical section tapering from a greater diameter at an outer distal end thereof to a lesser diameter at an inner portion of said seal, wherein said greater diameter is substantially larger than said lesser diameter.

3. The telescoping fluid coupling of claim 2, wherein said seal is positioned within said seal holding groove with said greater diameter of said truncated conical section thereof positioned into abutting engagement with said annular abutment surface to preclude a passage of said seal into said mounting aperture, said lesser diameter of said seal being positioned towards said hollow interior of said main body.

4. The telescoping fluid coupling of claim 3, wherein a juncture between said seal holding groove and said hollow interior is tapered to permit an engagement and radial compression of said seal during movement thereof from said seal holding groove and into said hollow interior of said main body.

5. A telescoping fluid coupling comprising:
   a main body having a hollow interior and a mounting aperture directed into said hollow interior thereof for facilitating a coupling of said main body to a first pipe end to position said hollow interior into fluid communication with said first pipe end, said main body being shaped so as to define a circumferential seal holding groove means formed along said interior surface of said hollow interior thereof;
   a telescoping tube projecting into said hollow interior of said main body and into fluid communication with said hollow interior, said telescoping tube being shaped so as to define a tapered end and a circumferential seal mounting groove extending about said telescoping tube and positioned adjacent to said tapered end thereof;
   and,
   a seal first positioned within said seal holding groove means, said telescoping tube is slidably positioned within said hollow interior of said main body to engage said seal and urge said seal into said seal mounting groove, said seal is then removed from said seal holding groove means and moved into said hollow interior of said main body by said telescoping tube to sealingly engage interior sidewalls thereof to permit said telescoping tube to be extended a desired distance from said main body to couple with a second pipe end.

6. A telescoping fluid coupling comprising:
   a main body having a hollow interior and a mounting aperture directed into said hollow interior thereof for facilitating a coupling of said main body to a first pipe end to position said hollow interior into fluid communication with said first pipe end, said main body being shaped so as to define a circumferential seal holding groove formed along said interior surface of said hollow interior thereof, wherein said circumferential seal holding groove is characterized as having a first diameter with said hollow interior being characterized as having a third diameter, wherein said first diameter is substantially greater than said third diameter, with a juncture between said seal holding groove and said hollow interior being tapered, with said mounting aperture having a second diameter, wherein said first diameter is substantially greater than said second diameter to define an annular abutment surface and said third diameter is intermediate said first and second diameters;
   a telescoping tube projecting into said hollow interior of said main body and into fluid communication with said hollow interior, said telescoping tube being shaped so as to define a tapered end and a circumferential seal mounting groove extending about said telescoping tube and positioned adjacent to said tapered end thereof;
   and,
   a seal first positioned within said seal holding groove, said seal comprising a cylindrical section coupled to a truncated conical section, said truncated conical section tapering from a greater diameter at an outer distal end thereof to a lesser diameter at an inner portion of said seal, wherein said greater diameter is substantially larger than said lesser diameter, said seal being first positioned within said seal holding groove with said greater diameter of said truncated conical section thereof positioned into abutting engagement with said annular abutment surface to preclude a passage of said seal into said mounting aperture, said lesser diameter of said seal being positioned towards said hollow interior of said main body, wherein said telescoping tube is then slidably positioned within said hollow interior of said main body to engage said seal onto said circumferential seal mounting groove extending about said telescoping tube, whereby said seal is removed from said seal holding groove and is into said hollow interior of said main body to sealingly engage interior sidewalls thereof to permit said telescoping tube to be extended a desired distance from said main body to couple with a second pipe end.

\* \* \* \* \*